(12) United States Patent
Utsumi

(10) Patent No.: US 6,807,482 B2
(45) Date of Patent: Oct. 19, 2004

(54) NAVIGATION APPARATUS AND NAVIGATION METHOD

(75) Inventor: Koichiro Utsumi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/356,589

(22) Filed: Feb. 3, 2003

(65) Prior Publication Data

US 2003/0154023 A1 Aug. 14, 2003

(30) Foreign Application Priority Data

Feb. 14, 2002 (JP) .......................................... 2002-037216

(51) Int. Cl.$^7$ .............................. G06F 19/00; G06F 7/00
(52) U.S. Cl. ........................ 701/209; 701/25; 340/990
(58) Field of Search ................................. 701/209, 201, 701/207, 210, 211, 23, 25; 340/990–994; 342/458, 457

(56) References Cited

U.S. PATENT DOCUMENTS

| | | | | |
|---|---|---|---|---|
| 4,758,959 A | * | 7/1988 | Thoone et al. | 701/221 |
| 5,412,573 A | * | 5/1995 | Barnea et al. | 701/211 |
| 5,774,827 A | * | 6/1998 | Smith et al. | 701/209 |
| 6,212,470 B1 | * | 4/2001 | Seymour et al. | 340/995.2 |
| 6,421,602 B1 | * | 7/2002 | Bullock et al. | 701/201 |
| 6,526,349 B2 | * | 2/2003 | Bullock et al. | 701/209 |

FOREIGN PATENT DOCUMENTS

JP 11-23301 A 1/1999

\* cited by examiner

Primary Examiner—Thomas G. Black
Assistant Examiner—Ronnie Mancho
(74) Attorney, Agent, or Firm—Birch, Stewart, Kolasch & Birch, LLP

(57) ABSTRACT

A navigation apparatus includes a notification unit for, in a case where a route searching unit cannot carry out route searching for an area in the vicinity of a destination, notifying users that the route searching unit cannot carry out route searching for the area in the vicinity of the destination when a physical quantity associated with a relationship between the current position of a vehicle determined by a current position determination unit and the destination is less than a preset reference value.

17 Claims, 5 Drawing Sheets

NAVIGATION APPARATUS AND NAVIGATION METHOD

This nonprovisional application claims priority under 35 U.S.C. § 119(a) on Patent Application No. 2002-037216 filed in JAPAN on Feb. 14, 2002, which is herein incorporated by reference.

BACKGROUND OF THE INVENTION

1. Field of the Invention

The present invention relates to a navigation apparatus for and a navigation method of searching for a route from a place of departure to a destination.

2. Description of Related Art

When users set a destination, prior art navigation apparatuses can search for a route from a place of departure to the destination and display the route on a display. However, because the route searching cannot be carried out for an area in the vicinity of the destination when a road leading to the destination has a zone that is closed to vehicles, for example, prior art navigation apparatuses have no alternative but to search for a route from the place of departure to a place located forward of the destination, and then display the route on the display.

Such dispensing of information to users is insufficient so that users cannot finally recognize a desired route to the destination from the on-screen route from the place of departure to a place located forward of the destination. Japanese patent application publication (TOKKAIHEI) No. 11-23301 discloses a navigation apparatus that, when the navigation apparatus cannot carry out the route searching for an area in the vicinity of the destination, notifies users of the fact that the route searching cannot be carried out for an area in the vicinity of the destination in order to complement the insufficient dispensing of information to users.

A problem encountered with prior art navigation apparatuses constructed as mentioned above is that although, when determining that they cannot carry out the route searching for an area in the vicinity of the destination, notifies users of the fact that the route searching cannot be carried out for an area in the vicinity of the destination, users cannot know the reason why the route searching cannot be carried out for an area in the vicinity of the destination even if they are notified of the fact at a time of departure. When taking a distance drive for a long time, for example, some users might forget the fact that the route searching cannot be carried out for an area in the vicinity of the destination. In such a case, the route guidance can be stopped suddenly before the vehicle reaches the destination, and this results in creating confusion for users.

SUMMARY OF THE INVENTION

The present invention is proposed to solve the above-mentioned problems, and it is therefore an object of the present invention to provide a navigation apparatus and a navigation method capable of surely notifying users that the route searching cannot be carried out for an area in the vicinity of a destination, and making users recognize the fact that the route guidance will be stopped before a vehicle that uses the navigation apparatus or the navigation method reaches the destination.

In accordance with an aspect of the present invention, there is provided a navigation apparatus including a notification unit for, in a case where a route searching unit cannot carry out route searching for an area in the vicinity of a destination, notifying users that the route searching unit cannot carry out route searching for the area in the vicinity of the destination when a physical quantity associated with a relationship between the current position of a vehicle determined by a current position determination unit and the destination is less than a preset reference value.

As a result, the navigation apparatus can make users recognize the fact that route guidance will be stopped before the vehicle reaches the destination.

In accordance with another aspect of the present invention, there is provided a navigation method including the step of, in a case where route searching cannot be carried out for an area in the vicinity of a destination, notifying users that route searching cannot be carried out for the area in the vicinity of the destination when a physical quantity associated with a relationship between the current position of a vehicle and the destination is less than a preset reference value.

As a result, the navigation method can make users recognize the fact that route guidance will be stopped before the vehicle reaches the destination.

Further objects and advantages of the present invention will be apparent from the following description of the preferred embodiments of the invention as illustrated in the accompanying drawings.

BRIEF DESCRIPTION OF THE DRAWINGS

FIG. 6 is an explanatory drawing showing a screen that allows users to select a facility that is a target to be searched for.

DETAILED DESCRIPTION OF THE PREFERRED EMBODIMENTS

The invention will now be described with reference to the accompanying drawings.

Embodiment 1.

Figure 1:
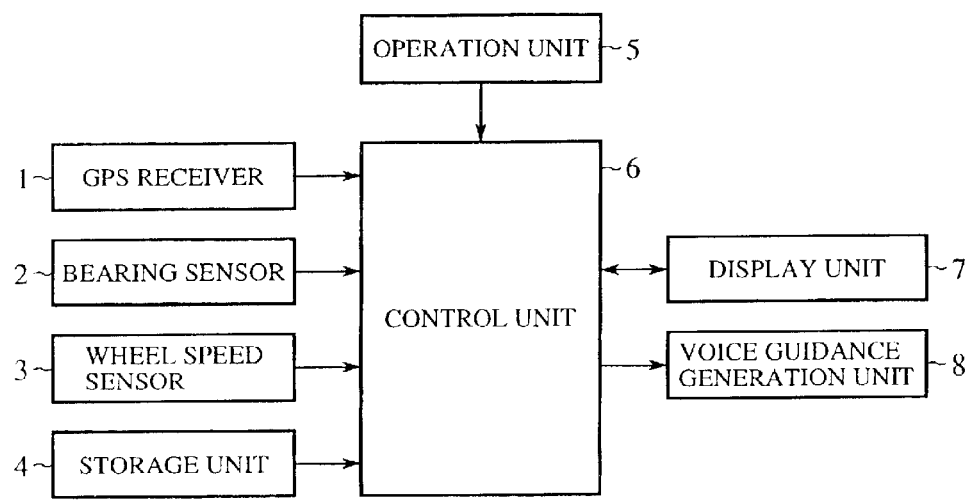
FIG. 1 is a block diagram showing the structure of a navigation apparatus according to embodiment 1 of the present invention.

FIG. 1 is a block diagram showing the structure of a navigation apparatus according to embodiment 1 of the present invention. In the figure, reference numeral 1 denotes a GPS receiver for receiving electric waves sent from space satellites, such as GPS satellites, reference numeral 2 denotes a bearing sensor for detecting the direction of travel in which a vehicle equipped with the navigation apparatus is headed by using the earth's magnetic field, for example, and for outputting a bearing signal indicating the direction of travel, reference numeral 3 denotes a wheel speed sensor for measuring a number of rotations of a wheel of the vehicle so as to determine the distance traveled by the vehicle and for outputting a distance signal indicating the distance, and reference numeral 4 denotes a storage unit (storage means) provided with a storage medium for storing map data and audio data used for guidance by voice, such as a CD-ROM, for outputting map data and audio data.

In the map data, each road in any map is divided into links by a plurality of nodes, such as intersections, so that a portion of each road between any two adjacent nodes is defined as a link. Thus any map can be constructed by connecting links with one another. In addition, the map data is so hierarchized in two levels that the map data includes lower-level map data and higher-level map data. The lower-level map data includes data on detailed maps of relatively small areas, and the higher-level map data includes data on maps of relatively large areas.

Reference numeral 5 denotes an operation unit, such as a wireless remote controller, for accepting a setting of a destination and a via point by allowing users to specify them on a map displayed on a display 7, and for accepting a change in the scale of the map displayed on the display 7 and other operations. The operation unit 5 constitutes a setting means for accepting an update of a preset reference value (i.e., a preset reference distance or a preset reference time), which will be described later.

Reference numeral 6 denotes a control unit (current position determination means, route searching means, display means, and notification means), such as a microcomputer, having a current position determination function of determining the current position of the vehicle based on output signals from the GPS receiver 1, the bearing sensor 2, and the wheel speed sensor 3, a route searching function of searching for a route from a place of departure to a destination, a display function of displaying the route searched for by using the route searching function on an on-screen road map displayed on the display 7, a notification function of, when the route searching function cannot carry out route searching for an area in the vicinity of the destination, notifying users of the fact that the route searching function cannot carry out route searching for an area in the vicinity of the destination when the distance from the current position to the destination becomes less than a preset reference distance, and other various arithmetic processing functions.

Figure 3:
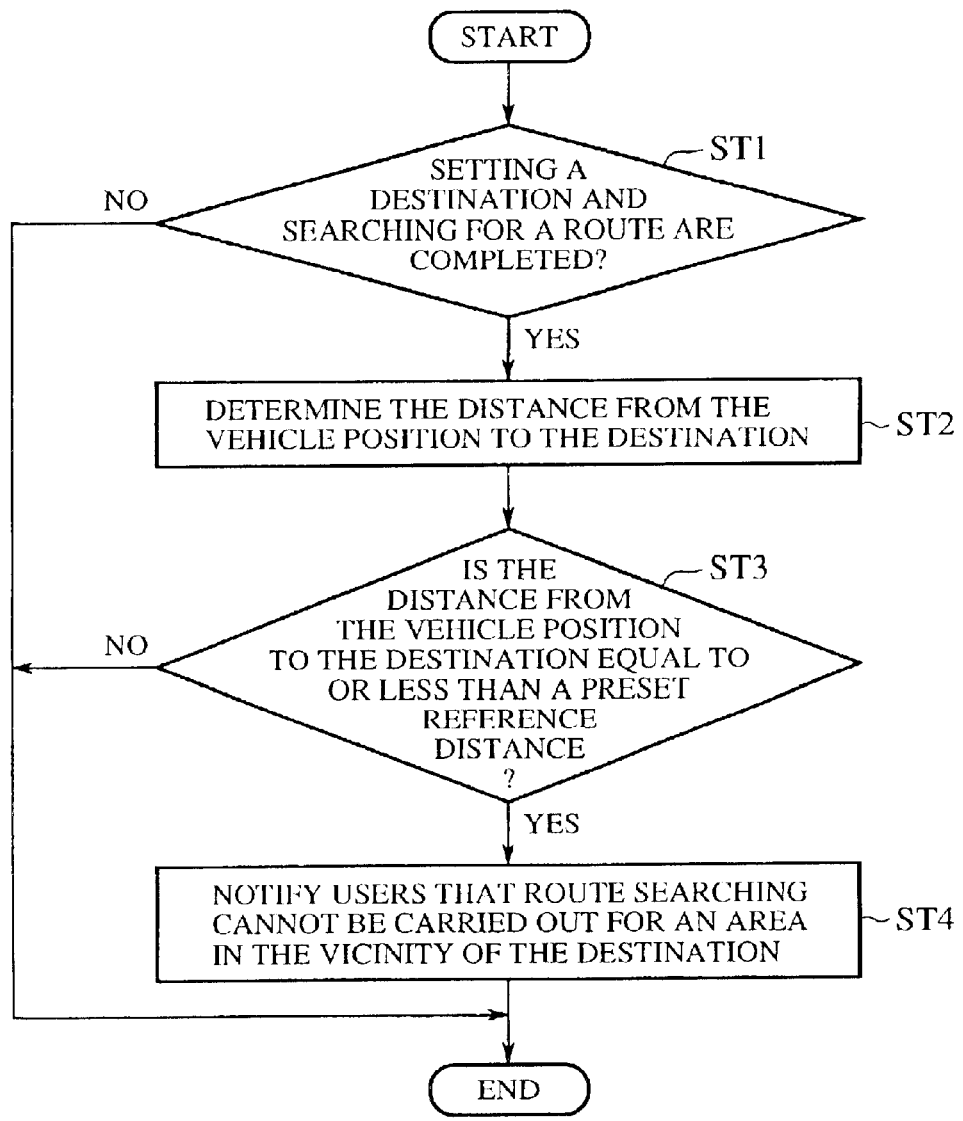
FIG. 3 is a flow chart showing a navigation method according to embodiment 1 of the present invention.

The display (display means) 7, such as a liquid crystal panel, is disposed in an instrument panel of the vehicle, and can display a road map on which the route from the place of departure to the destination is shown. Reference numeral 8 denotes a voice guidance generator for providing guidance showing the direction of travel in which the vehicle is headed under control of the control unit 6 by voice. FIG. 3 is a flow chart showing a navigation method according to embodiment 1 of the present invention.

Next, a description will be made as to an operation of the navigation apparatus. First of all, when a user operates the operation unit 5 to set a destination and a via point, the control unit 6 of the navigation apparatus determines a route from a place of departure (i.e., the current position of the vehicle which is measured when the destination is set), by way of the via point, to the destination by referring to the map data stored in the storage unit 4 according to Dijkstra's algorithm (calculation of evaluations by using link length, road type, road width, and so on), for example.

Next, a description will be made as to route searching performed by the control unit 6. First of all, the control unit 6 reads a lower-level map including the place of departure, a lower-level map including the via point, and a lower-level map including the destination from the storage unit 4, and reads a higher-level map including the place of departure and the destination, and stores them in a RAM or the like of the control unit 6. The control unit 6 then sets a route for each of those lower-level maps, and connects between the routes respectively set for the lower-level maps by using the higher-level map, selects a candidate with the highest evaluation (i.e., the smallest road cost) from among candidates for the route from the place of departure to the via point, and also selects a candidate with the highest evaluation from among candidates for the route from the via point to the destination so as to set an optimum route from the place of departure to the destination.

When setting an optimum route from the place of departure to the destination, the control unit 6 defines every node on the route at which the vehicle should make a right or left turn as an intersection that is a target for guidance by determining the angle between links at the node and sets a flag for the node. As a result, when viewed from the current position of the vehicle, the nearest intersection having a set flag is an intersection that is the next target for guidance. The control unit 6 causes the voice guidance generator 8 to generate voice guidance instructing users to make a right or left turn when the vehicle reaches a predetermined position forward of the nearest intersection that is the next target for guidance.

The map data stored in the storage unit 4 contains information about whether or not route searching can be carried out as an attribute for each road data. Each road data is stored as a set of "nodes" and "links" that are pieces of information used for forming road network data while being associated with various attribute data. When there is a road having an attribute showing that route searching cannot be carried out (for example, a road having a zone where ordinary vehicles are prohibited from passing or a private road) in the vicinity of the destination or the via point, or when there is no road in the vicinity of the destination or the via point, there is a possibility that route searching cannot be carried out for an area in the vicinity of the destination or the via point.

Figure 2:
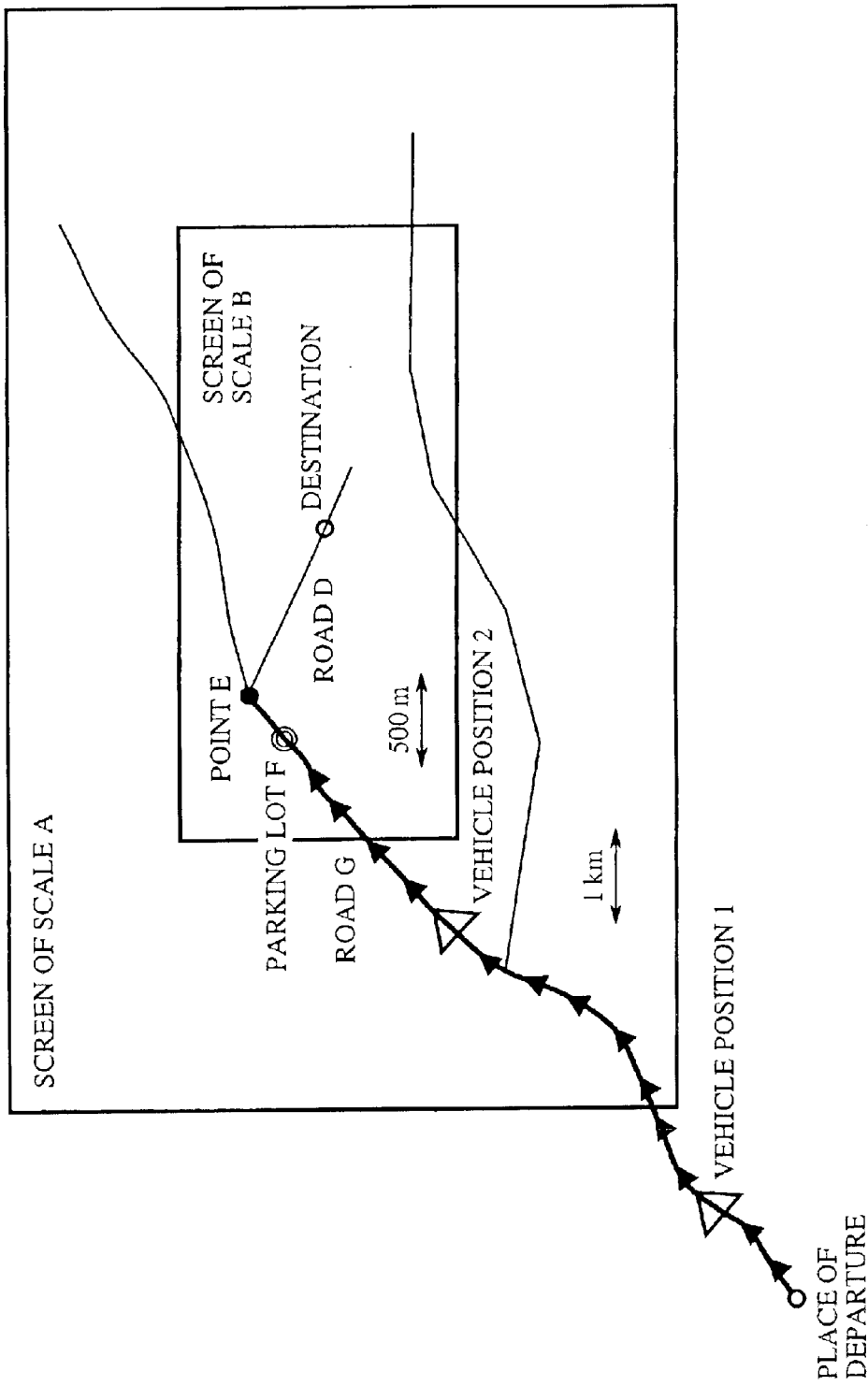
FIG. 2 is an explanatory drawing showing a result of searching for a route from a place of departure to a destination.

FIG. 2 is an explanatory drawing for showing a result of searching for an optimum route from the place of departure to the destination. In the example of FIG. 2, while a road C made in a heavy line and extending from the place of departure to a point E is a road that is searched for by the control unit 6, a road D made in a thin line and extending from the point E to the destination is a road that cannot be searched for by the control unit 6 and that is excluded from target roads to be searched for. In accordance with this embodiment 1, when route searching cannot be carried out for an area in the vicinity of the destination, as shown in FIG. 2, the control unit 6 can notify users of the fact that route searching cannot be carried out for an area in the vicinity of the destination.

Hereafter, the notification function of the control unit 6 will be explained concretely. First of all, when a user operates the operation unit 5 so as to set a destination and a via point (in step ST1), the control unit 6 searches for an optimum route from the place of departure, by way of the via point, to the destination by referring to the map data stored in the storage unit 4, as mentioned above, and displays the route on the display 7, as shown in FIG. 2. The control unit 6 then determines the current position of the vehicle based on received signals from the GPS receiver 1 and so on, and displays a mark ("Δ" in the example of FIG. 2) indicating the current position of the vehicle on an on-screen map.

Furthermore, the control unit 6 calculates the distance from the current position of the vehicle to the destination when determining the current position of the vehicle (in step ST2), and then compares the distance from the current position of the vehicle to the destination with a preset reference distance (in step ST3). When the vehicle approaches the destination and the distance from the current position of the vehicle to the destination becomes shorter than the preset reference distance, the control unit 6 notifies users of the fact that the control unit 6 cannot carry out route searching for an area in the vicinity of the destination (in step ST4). In other words, the control unit 6 displays a message indicating the fact that the control unit 6 cannot carry out route searching for an area in the vicinity of the destination on the display 7. Instead, the control unit 6 causes the voice guidance generator 8 to provide guidance indicating the fact that the control unit 6 cannot carry out route searching for an area in the vicinity of the destination for users by voice.

Users can change the preset reference distance by operating the operation unit 5. For example, the control unit 6 can accept an update of the preset reference distance on condition that both the current position and the destination are not displayed on the screen of the display 7 at the same time. In other words, although the control unit 6 displays the current position of the vehicle and the destination on the screen of the display 7 at the same time when the vehicle approaches the destination, when notified of the fact that the control unit 6 cannot carry out route searching for an area in the vicinity of the destination after the vehicle approaches the destination too much, users cannot have enough time to decide what to do about the notification about the fact. Therefore, in order to notify users of the fact that the control unit 6 cannot carry out route searching for an area in the vicinity of the destination when there is some distance from the current position of the vehicle to the destination, the control unit 6 is so constructed as to accept a change in the preset reference distance only when both the current position and the destination are not displayed on the screen of the display 7 at the same time.

Figure 4:
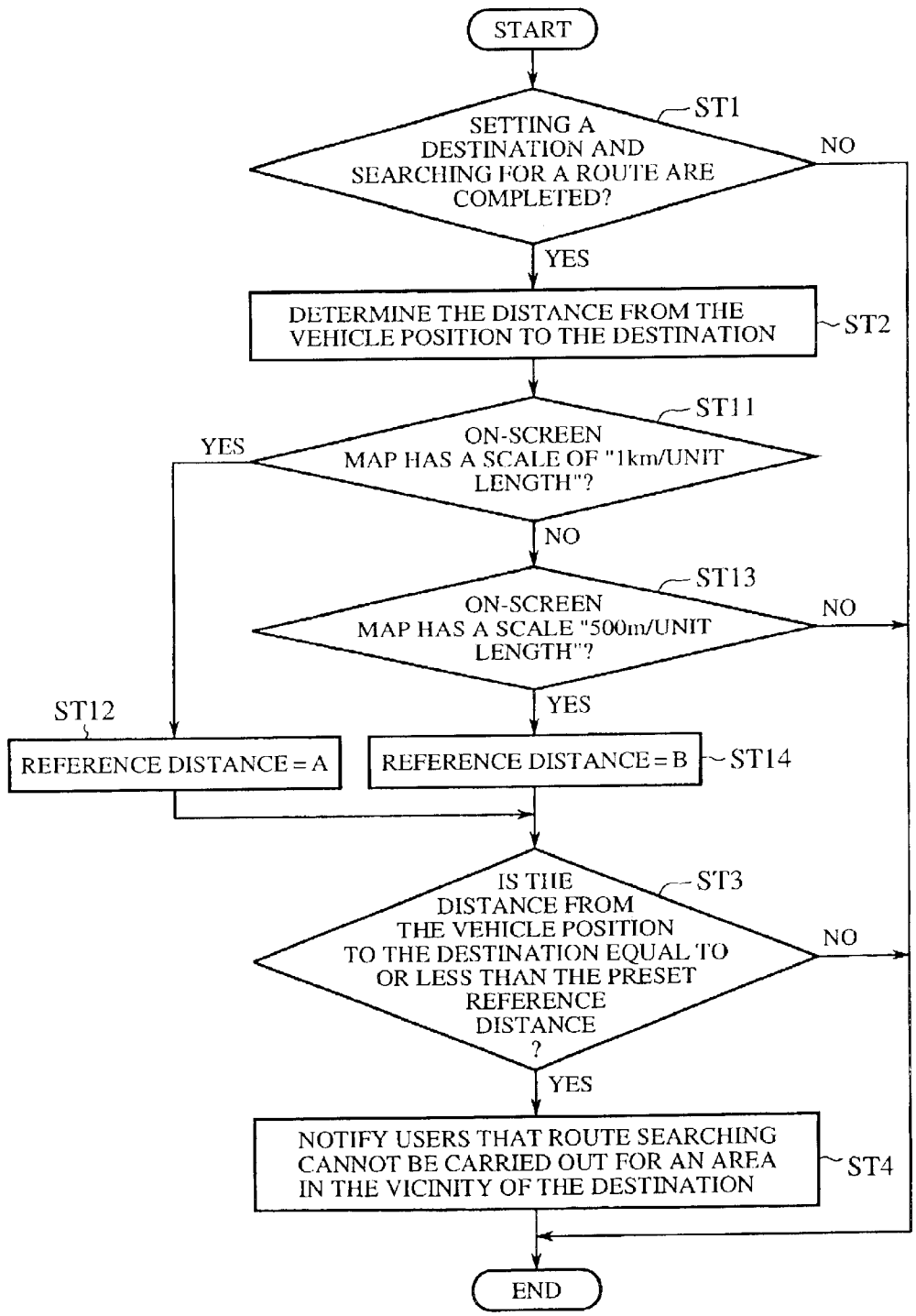
FIG. 4 is a flow chart showing a navigation method when a reference distance is preset in synchronization with the scale of a map which is to be displayed on a display.

FIG. 4 is a flow chart showing a navigation method when the reference distance is preset in synchronization with the scale of a map which is to be displayed on the display 7. When a user operates the operation unit 5 so as to change the scale of a map displayed on the display 7, the control unit 6 automatically sets the reference distance according to the change in the scale of the on-screen map. For example, the control unit 6 determines whether the scale of the on-screen map is "1 km/unit length" or "500 m/unit length", and, if the scale is "1 km/unit length", sets the reference distance to "A", whereas if the scale is "500 m/unit length", sets the reference distance to "B" (in steps ST11 to ST14), where A>B.

As previously mentioned, in accordance with this embodiment 1, when the control unit 6 cannot carry out route searching for an area in the vicinity of the destination, the navigation apparatus notifies users the fact that the control unit 6 cannot carry out route searching for an area in the vicinity of the destination when the distance from the current position of the vehicle to the destination becomes shorter than a preset reference distance. As a result, the navigation apparatus can make users recognize the fact that route guidance will be stopped before the vehicle reaches the destination.

Embodiment 2.

As previously mentioned, in accordance with above-mentioned embodiment 1, when the control unit 6 cannot carry out route searching for an area in the vicinity of a destination, the navigation apparatus notifies users the fact that the control unit 6 cannot carry out route searching for an area in the vicinity of the destination when the distance from the current position of the vehicle and the destination becomes shorter than a preset reference distance. In contrast, in accordance with embodiment 2, when the control unit 6 cannot carry out route searching for an area in the vicinity of a via point, the navigation apparatus can notify users the fact that the control unit 6 cannot carry out route searching for an area in the vicinity of the via point when the distance from the current position of the vehicle and the via point becomes shorter than a preset reference distance.

Embodiment 3.

As previously mentioned, in accordance with any one of above-mentioned embodiments 1 and 2, the navigation apparatus compares the distance from the current position of the vehicle to a destination or via point with a preset reference distance when notifying users the fact that the control unit 6 cannot carry out route searching for an area in the vicinity of the destination or via point. In contrast, in accordance with embodiment 3, the navigation apparatus compares an estimated time required for the vehicle to travel from the current position of the vehicle to a destination or via point with a preset reference time and notifies users the fact that the control unit 6 cannot carry out route searching for an area in the vicinity of the destination or via point when the estimated time required for the vehicle to travel from the current position of the vehicle to the via point becomes shorter than the preset reference time. Embodiment 3 offers the same advantage as provided by above-mentioned embodiments 1 and 2. The navigation apparatus can calculate the time required for the vehicle to travel from the current position of the vehicle to the destination or via point from an estimated speed of the vehicle and the distance from the current position of the vehicle to the destination or via point.

Users can change the preset reference time by operating the operation unit 5. For the reason previously mentioned in embodiment 1, the control unit 6 can accept an update of the preset reference time on condition that both the current position and the destination or via point are not displayed on the screen of the display 7 at the same time.

Embodiment 4.

Figure 5:
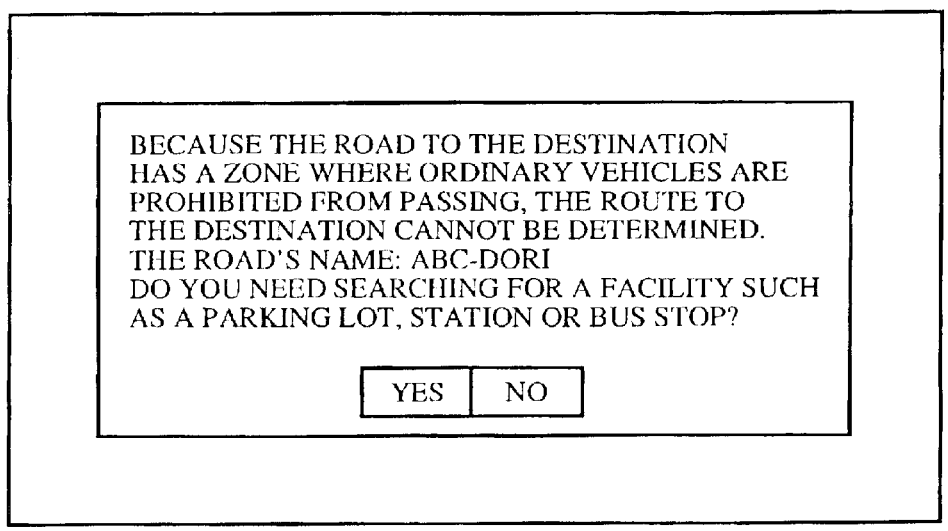
FIG. 5 is an explanatory drawing showing an example of a screen showing the reason why route searching cannot be carried out.

As previously mentioned, in accordance with any one of embodiment 1 to 3, the navigation apparatus can also notify users of the reason why the control unit 6 cannot carry out route searching for an area in the vicinity of a destination or via point when notifying users of the fact that the control unit 6 cannot carry out route searching for an area in the vicinity of the destination or via point. Concretely, the navigation apparatus can make such a notification as "Because the road to the destination has a zone where ordinary vehicles are prohibited from passing, the route to the destination cannot be determined." or "Because there is no road in the vicinity of the destination, the route to the destination cannot be determined." The navigation apparatus can also notify users of the name of the road having a zone where ordinary vehicles are prohibited from passing. FIG. 5 is an explanatory drawing showing an example of a screen showing the reason why the control unit 6 cannot carry out route searching for an area in the vicinity of the destination.

Figure 6:
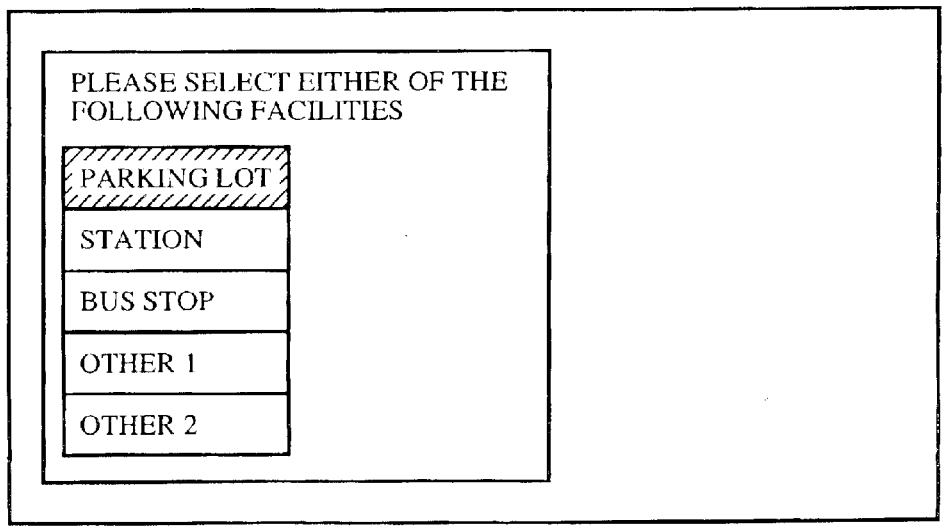

The control unit 6 can search for a facility (for example, a parking lot, a station, or a bus stop) in the vicinity of the destination or via point, as shown in FIG. 6, when the control unit 6 cannot carry out route searching for an area in the vicinity of the destination or via point. When a user operates the operation unit 5 so as to select "Yes" in the screen of FIG. 5, the control unit 6 displays a selection screen for allowing the user to select a facility, as shown in FIG. 6, on the screen of the display 7.

For example, when the user selects searching of a parking lot, the control unit 6 searches for a node that is the nearest to the destination. In other words, the control unit 6 searches for the point E • in FIG. 2 and then searches for a parking lot located in the vicinity of an area including the point E • as the center thereof. As a result, the control unit 6 finds a parking lot F and then displays a mark indicating the parking lot F on the map displayed on the display 7. Therefore, the user can go to the destination on foot after parking the vehicle at the parking lot F.

As previously mentioned, in accordance with this embodiment 4, when the distance from the current position of the vehicle to the destination or via point becomes shorter than the preset reference distance, or when the time required for the vehicle to travel from the current position of the vehicle to the destination or via point becomes shorter than the preset reference time, the navigation apparatus notifies users of both the fact that the control unit 6 cannot carry out route searching for an area in the vicinity of the destination or via point and the reason why the control unit 6 cannot carry out route searching for an area in the vicinity of the destination or via point. In addition, immediately after the control unit 6 finishes searching for the route, the navigation apparatus can notify users of both the fact that the control unit 6 cannot carry out route searching for an area in the vicinity of the destination or via point and the reason why the control unit 6 cannot carry out route searching for an area in the vicinity of the destination or via point.

Embodiment 5.

As previously mentioned, in accordance with any one of above-mentioned embodiments 1 to 4, in a case where the control unit 6 cannot carry out route searching for an area in the vicinity of a destination or via point, when the distance from the current position of the vehicle to the destination or via point becomes shorter than a preset reference distance, for example, the navigation apparatus notifies users of the fact that the control unit 6 cannot carry out route searching for an area in the vicinity of the destination or via point. A navigation apparatus in accordance with embodiment 5 further includes a function of allowing users to stop the function of notifying users of the fact that the control unit 6 cannot carry out route searching for an area in the vicinity of the destination or via point, the function of searching for a facility in the vicinity of the destination or via point and so on of the control unit 6 by operating the operation unit 5. As a result, when users determine that any notification about the fact that the control unit 6 cannot carry out route searching an area in the vicinity of the destination or via point is not needed and any other searching is not needed, the navigation apparatus of this embodiment 5 can prevent unnecessary notification from being provided for users and can also prevent unnecessary searching from being carried out.

Many widely different embodiments of the present invention may be constructed without departing from the spirit and scope of the present invention. It should be understood that the present invention is not limited to the specific embodiments described in the specification, except as defined in the appended claims.

What is claimed is:

1. A navigation apparatus comprising:
   a current position determination means for determining a current position of the vehicle;
   a storage means for storing map data;
   a route searching means for searching for a route from a place of departure to a destination by referring to the map data stored in said storage means;
   a guidance means for outputting instructions to guide a user toward guidance targets on the route searched for by said route searching means; and
   a notification means for, in a case where said route searching means cannot carry out route searching for an area in the vicinity of the destination, outputting a notification to the user that said route searching means cannot carry out route searching for the area in the vicinity of the destination when a physical quantity is determined to be less than a preset reference value, thereby indicating that the vehicle is approaching the destination, the physical quantity being associated with a relationship between the current position of the vehicle determined by said current position determination means and the destination,
   wherein the notification means is operable to output the notification before the guidance means finishes outputting the instructions, if the physical quantity is determined to be less than the preset reference value before the instructions corresponding to a last one of the guidance targets is output.

2. The navigation apparatus according to claim 1, wherein in a case where said route searching means cannot carry out route searching for an area in the vicinity of a via point, said notification means notifies users that said route searching means cannot carry out route searching for the area in the vicinity of the via point when a quantity associated with a relationship between the current position determination means and the via point is less than a preset reference value.

3. The navigation apparatus according to claim 2, wherein said physical quantity is either a distance between the current position of the vehicle determined by said current position determination means and the via point or a time required for the vehicle to travel from the current position of the vehicle to the via point.

4. The navigation apparatus according to claim 1, wherein said physical quantity is either a distance between the current position of the vehicle determined by said current position determination means and the destination or a time required for the vehicle to travel from the current position of the vehicle to the destination.

5. The navigation apparatus according to claim 1, further comprising a setting means for accepting an update of the present reference value.

6. The navigation apparatus according to claim 5, wherein said setting means accepts an update of the present reference value only when both the current position of the vehicle and the destination or the via point are not displayed simultaneously on an on-screen map.

7. The navigation apparatus according to claim 1, wherein said notification means also makes a notification about a reason why said route searching means cannot carry out route searching for an area in the vicinity of the destination when making a notification that said route searching means cannot carry out route searching for the area.

8. The navigation apparatus according to claim 7, wherein said notification means also makes a notification that said route searching means cannot carry out route searching for an area in the vicinity of the destination and a notification about a reason why said route searching means cannot carry out route searching for the area when said route searching means finishes searching for the route.

9. The navigation apparatus according to claim 1, further comprising a means for searching for a facility located in the vicinity of the destination or a via point when said route searching means cannot carry out route searching for an area in the vicinity of the destination or the via point.

10. The navigation apparatus according to claim 1, wherein said notification means displays notifications on a display.

11. The navigation apparatus according to claim 1, wherein said notification means outputs notifications by voice from a speaker.

12. The navigation apparatus according to claim 1, further comprising a means for enabling or disabling said notification means.

13. A navigation method comprising the steps of:

determining a current position of a vehicle;

searching for a route from a place of departure to a destination by referring to map data;

outputting instructions to guide a user toward guidance targets on the route searched for; and in a case where route searching cannot be carried out for an area in the vicinity of the destination, outputting a notification to users that route searching cannot be carried out for the area in the vicinity of the destination when a physical quantity is determined to be less than a preset reference value, thereby indicating that the vehicle is approaching the destination, the physical quantity being associated with a relationship between the current position of the vehicle and the destination, wherein the notification outputting step outputs the notification before the instruction outputting step is finished outputting the instructions, if physical quantity is determined to be less than the preset reference value before the instructions corresponding to a last one of the guidance targets is output.

14. The navigation method according to claim 13, wherein said physical quantity is either a distance between the current position determination means and the destination or a time required for the vehicle to travel from the current position of the vehicle to the destination.

15. A navigation method for a vehicle comprising the steps of:

searching for a route from a place of departure to a destination using map data;

determining a current position of the vehicle; guiding a user toward guidance targets on the route searched for;

determining a physical quantity according to the current position of the vehicle;

determining that route searching is unavailable for an area to be searched by the searching step; and notifying a user that that route searching is unavailable for the area when the physical quantity is less than a preset reference value, wherein the notifying step notifies the user before the guiding step finishes guiding the user.

16. The navigation method of claim 15, further comprising the step of setting the preset reference value.

17. The navigation method of claim 15, further comprising changing the preset reference value.

* * * * *